United States Patent
Strahl et al.

(10) Patent No.: US 12,411,050 B1
(45) Date of Patent: Sep. 9, 2025

(54) RADIAL LOAD MEASURING APPARATUS

(71) Applicant: BPG-ARROWHEAD WINCH INC., Broken Arrow, OK (US)

(72) Inventors: Shane Strahl, Jenks, OK (US); Floyd James Hendrix, Coweta, OK (US); Jonathan Miller, Skiatook, OK (US); Christopher A. Nelson, Lake Preston, SD (US)

(73) Assignee: BPG-ARROWHEAD WINCH INC., Broken Arrow, OK (US)

( * ) Notice: Subject to any disclaimer, the term of this patent is extended or adjusted under 35 U.S.C. 154(b) by 10 days.

(21) Appl. No.: 18/671,745

(22) Filed: May 22, 2024

(51) Int. Cl.
*G01L 5/10* (2020.01)
*G01L 1/14* (2006.01)
*G01L 1/22* (2006.01)

(52) U.S. Cl.
CPC ............... *G01L 5/10* (2013.01); *G01L 1/142* (2013.01); *G01L 1/22* (2013.01)

(58) Field of Classification Search
CPC .............. G01L 5/10; G01L 1/142; G01L 1/22
See application file for complete search history.

(56) References Cited

U.S. PATENT DOCUMENTS

| | | | |
|---|---|---|---|
| 4,015,468 A | | 4/1977 | Simon |
| 5,488,871 A | * | 2/1996 | Harbottle ............ G01L 5/12 73/862.55 |
| 9,476,802 B2 | | 10/2016 | Sato |
| 2023/0221200 A1 | | 7/2023 | Blake |

FOREIGN PATENT DOCUMENTS

| | | | | |
|---|---|---|---|---|
| JP | 2004003918 A | * | 1/2004 | ............ F16C 19/522 |
| JP | 2006214931 A | * | 8/2006 | |
| JP | 2010216654 A | * | 9/2010 | |
| JP | 2010216655 A | * | 9/2010 | |
| WO | WO-0177634 A2 | * | 10/2001 | ............... G01L 5/00 |

OTHER PUBLICATIONS

International Search Report and Written Opinion for International Application No. PCT/US2025/028206; mailed Jul. 1, 2025; 12 pages.

* cited by examiner

*Primary Examiner* — Octavia Hollington
(74) *Attorney, Agent, or Firm* — Seed Intellectual Property Law Group LLP

(57) ABSTRACT

A radial load measuring apparatus is disclosed, which may include a rotational member rotatably supported to rotate about an axis of rotation and configured to be subjected to a radial load, and at least one support member interfacing with the rotational member. Each support member may have a contact interface that is oriented at an oblique angle relative to a reference plane comprising the axis of rotation, such that the radial load applied to the rotational member is translated into a proportional axial force applied to the at least one support member in an axial direction. The radial load measuring apparatus may include a force sensor configured to measure the proportional axial force applied to the at least one support member from which to determine a magnitude of the radial load.

15 Claims, 4 Drawing Sheets

RADIAL LOAD MEASURING APPARATUS

BACKGROUND

Technical Field

The present disclosure relates generally to radial load measuring devices, specifically measuring devices for measuring a radial load (e.g., wire load) applied to a rotating drum of a winch or a hoist.

Description of the Related Art

Winches and hoists may be used to lift and/or pull an object, which may subject the winch or hoist to significant loads during operation. Both the torque and radial load that a winch or a hoist can withstand may be an important factor to consider when designing, selecting and/or using a winch or hoist. However, measuring a radial load being applied to a winch or hoist may be difficult to accurately determine and known systems may be overly complex or difficult to implement in cost effective manner. A solution for measuring a radial load being applied to a winch or a hoist throughout operation could provide significant improvements to the design, testing and use of winches and hoists.

BRIEF SUMMARY

Embodiments described herein include radial load measuring apparatuses and related radial load measuring techniques that are well suited to measure radial loads applied to a rotating member, such as a wire load applied to a rotating drum of a winch or a hoist.

For example, a radial load measuring apparatus according to an example embodiment may be summarized as including a rotational member rotatably supported to rotate about an axis of rotation and configured to be subjected to a radial load, at least one support member interfacing with the rotational member, and at least one force sensor. Each support member may have a contact interface that is oriented at an oblique angle relative to a reference plane comprising the axis of rotation such that the radial load applied to the rotational member is translated into proportional axial forces that are applied to the pair of support members in opposite axial directions. The force sensor may be configured to measure at least one of the proportional axial forces applied to the support members from which to determine a magnitude of the radial load.

In some embodiments, the support member may include at least a portion of a taper roller bearing assembly or other bearing assembly. In some embodiments, the support member may include a cone of a taper roller bearing assembly and the rotational member may be fitted with a cup of the taper roller bearing assembly. In such instances, during operation, the cone of the taper roller bearing assembly may be able to translate away from the cup of the taper roller bearing assembly to engage or interact with a force sensor. In this manner, the force sensor may be configured to measure the proportional axial force applied to the support member via displacement of the cone of the taper roller bearing assembly relative to the cup of the taper roller bearing assembly.

In some embodiments, the force sensor may be any of a capacitive load cell, a pneumatic or hydraulic piston sensor, and a strain gauge load cell that interacts with the support member, or any other type of force sensor. The force sensor or sensors may be arranged to measure the proportional axial force that is transferred by the support members with the obliquely aligned contact interface to redirect the radial load applied to the rotational member into the proportional axial force.

In some embodiments, the proportional axial force applied to the support member that is measured by the force sensor may be directly proportional to a magnitude of the radial load applied to the rotational member. In addition, a relationship between the proportional axial force and the magnitude of the radial load may be dictated by an angle or angles of the contact interfaces of the support members and a position of the support members in an axial direction.

In some embodiments, the rotational member may be a drum of a winch or hoist and the radial load applied to the drum may be a wire load. Accordingly, embodiments may provide active, real-time radial wire load measurements during operation or use of a winch or a hoist.

In some embodiments, a pair of support members may be provided and each support member of the pair of support members may interface with a respective one of the opposing ends of the rotational member. In this manner, the rotational member, e.g., drum, may be rotatably supported in a symmetric manner. In other instances, the rotational member, e.g., drum, may be supported asymmetrically and the load calculations contemplated herein may account for the same.

In some embodiments, the oblique angle of the contact interface of each support member may be uniform such that proportional axial forces are divided evenly or substantially evenly in opposing axial directions. The force sensor or sensor(s) may be arranged at only one end of the rotational member or, alternatively, at both of opposing ends of the rotational member. Having sensor(s) at both ends of the rotational member may enable enhanced accuracy of the load measurement. Providing sensor(s) at only one end of the rotational member may lead to a more compact apparatus that is less complex and less costly.

A method of measuring a radial load applied to a rotational member according to an example embodiment may be summarized as including, during application of the radial load, measuring at least one proportional axial force applied to support members and calculating a magnitude of the radial load based at least in part on the measurement of the proportional axial force. The rotational member may be rotatably supported to rotate about an axis of rotation and may be supported by at least one support member interfacing with the rotational member. In some instances, a pair of support members may be provided and each support member may include a contact interface that is oriented at an oblique angle relative to a reference plane comprising the axis of rotation, such that the radial load applied to the rotational member is translated into proportional axial forces that are applied to the pair of support members in opposite axial directions.

In some embodiments, the calculating of the magnitude of the radial load may be based in part on the oblique angle of the contact interface of the support members. In some embodiments, the calculating of the magnitude of the radial load may be based in part on a position of the support members in the axial direction.

In some embodiments, the radial load may vary over time and the measuring of the at least one of the proportional axial forces applied to the support members and the calculating of the magnitude of the radial load may be repeated periodically over time, or on demand. In this manner, embodiments may provide active, real-time load measurement functionality, or may provide radial load measurement on demand in response by a query of a user or operator, for example.

Although aspects of some of the embodiments disclosed herein are described in the context of measuring a wire load applied to a rotating drum of a winch or a hoist, it is appreciated that aspects may be utilized in a variety of applications to measure a radial load applied to various types of rotating members.

Furthermore, the embodiments disclosed herein may enable accurate measurement of a radial load, regardless of the direction of the radial load and regardless of axial location of the applied radial load. Additionally, the embodiments disclosed herein are configured to determine the radial load without regard to the torque acting on the rotating member.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with load measuring apparatuses and winches or hoists may not be shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
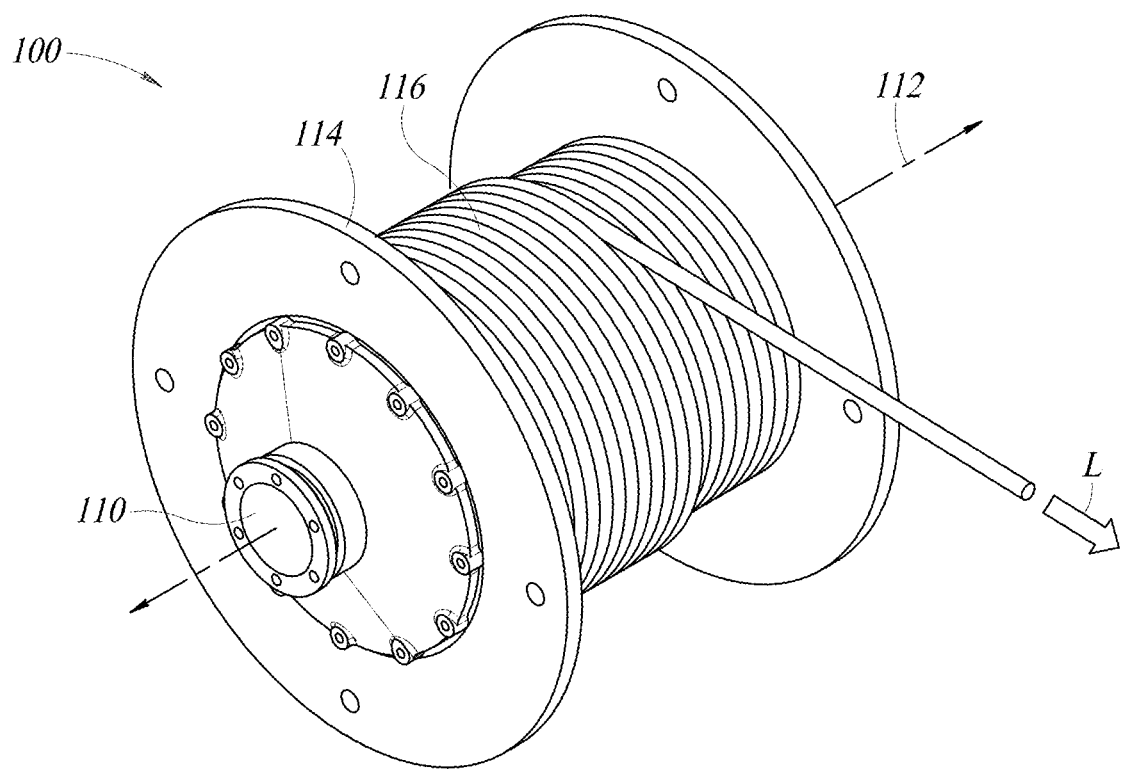
FIG. 1 shows a perspective view of an exemplary winch, which may include a radial load measuring apparatus according to embodiments described herein.

FIG. 1 shows a perspective view of a winch 100, in which a radial load measuring apparatus may be arranged. It should be understood that radial load measuring apparatuses as disclosed herein are not limited to winches and/or hoists, and may be utilized in a variety of devices with rotational members that experience radial loads. However, the winch 100 is provided as an example embodiment that may benefit from including a radial load measuring apparatus as described herein.

The winch 100 includes a shaft or drive member 110 defining an axis of rotation 112. The winch 100 includes a rotating member 114 (e.g., drum) that is rotatably supported on the drive member 110 and is configured to rotate about the axis of rotation 112 by a drive motor (not shown). In use, a cable, rope, wire, or chain (collectively referred to as wire 116 herein) having a first end and a second end opposite the first end may be fastened at the first end thereof to the rotating member 114. The wire 116 may be wound up about the rotating member 114, and the second end of the wire 116 may be coupled to a load to be pulled and/or lifted by the winch 100 under the power of the drive motor. The winch 100 can be operated to drive rotation of the rotating member 114 about the drive member 110 with respect to the piece of machinery to which the winch 100 is mounted, such as to wind up the wire 116 onto the rotating member 114 to pull the load toward the winch 100. When the winch 100 is operated, the winch 100 may be subjected to a radial load, such as in FIG. 1 in which the wire 116 is subjected to a radial load as represented by the arrow labeled L. When the winch 100 is subjected to a radial load L, the radial load is likewise applied to the rotating member 114.

Figure 2:
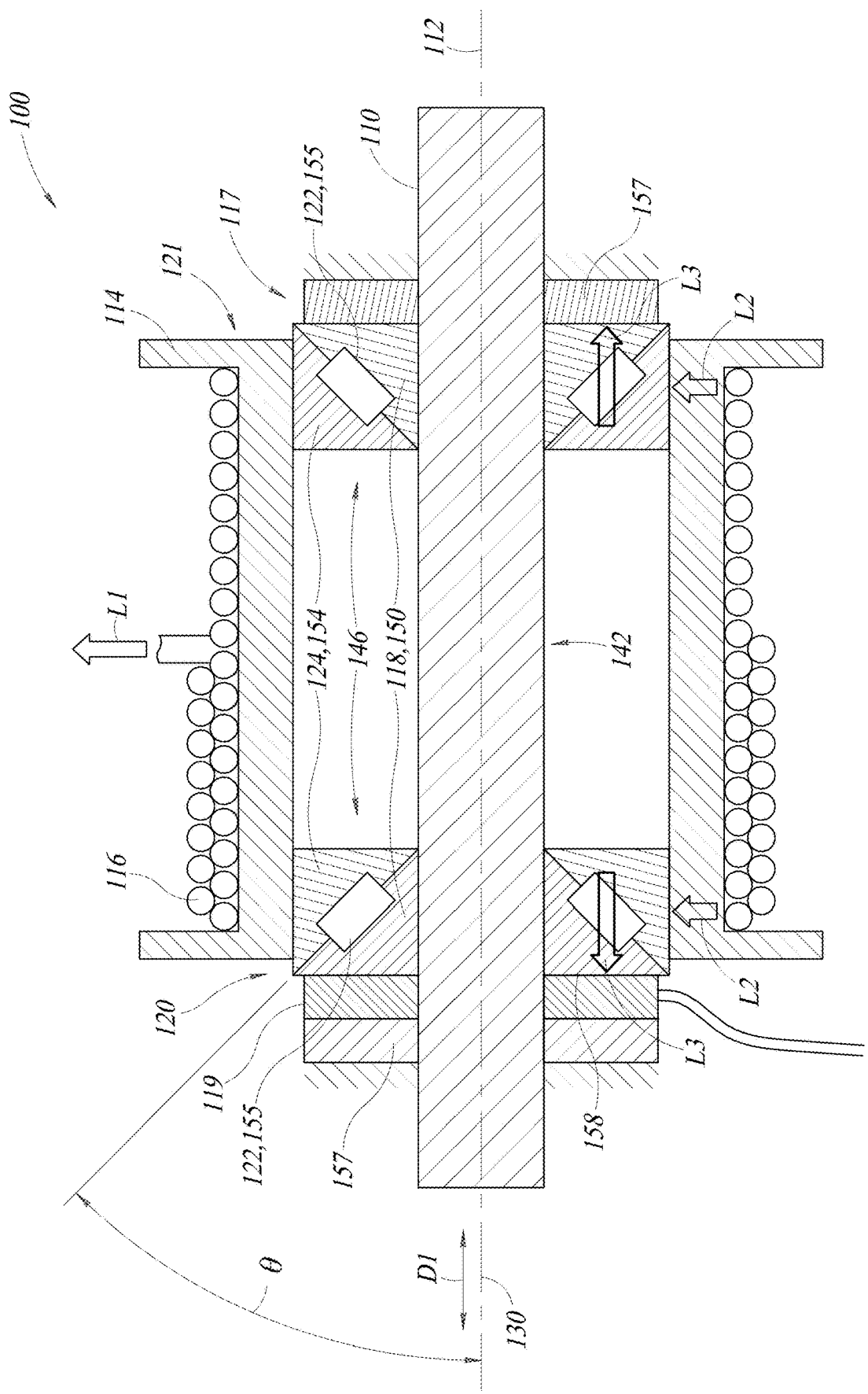
FIG. 2 shows a cross-sectional schematic view of a winch including a radial load measuring apparatus therein according to an embodiment.

FIG. 2 shows a cross-sectional schematic view of a winch 100 including an example embodiment of a radial load measuring apparatus 117 when a radial load L1 is applied thereto. As shown in FIG. 2, the radial load measuring apparatus 117 may include at least one support member 118 and at least one force sensor 119. In some embodiments, two or more support members 118 may be included. In some embodiments one or more of the at least one support member 118 may interface with the rotating member 114 or intervening structure fixedly coupled thereto. It should be understood that in an advantageous embodiment, two support members 118 may be opposite each other in the axial direction D1, such that the rotating member 114 is balanced on two or more support members 118. In some embodiments, two support members 118 may each interface with one of opposing ends 120, 121 of the rotating member 114 and the rotating member 114 may be supported in a symmetric or generally symmetric manner on the drive member 110. In other instances, the rotating member 114 may be supported symmetrically on the drive member 110. Notably, the drive member 110 is illustrated schematically and details thereof, including structures to drive the rotating member 114 about the axis of rotation 112, are not shown to avoid unnecessarily obscuring descriptions of the embodiments. Further, although the rotating member 114 is schematically illustrated as mounting to a common elongated drive member 110, it is appreciated that the rotating member 114 may be supported, either on an externally facing structure or surface or an internally facing structure or surface, by a variety of colinear circular members, such as, for example, a housing bore at one end of the rotating member 114 and outer circumferential surface of a brake housing at the other end of the rotating member 114.

Each support member 118 may include a contact interface 122. Each support member 118 may be coupled to the rotating member 114 at the contact interface 122. In some embodiments, a load transfer member 124 may be arranged between the contact interface 122 and the rotating member 114. The load transfer member 124 may transfer a load applied to the rotating member 114 to the contact interface 122 and in turn to the support member 118. The contact interface 122 may be oriented at an oblique angle θ relative to a reference plane 130 that includes the axis of rotation 112. The oblique angle θ may be, for example, between about 20 degrees and 50 degrees. In embodiments including a plurality of support members 118, each support member 118 may be configured in some instances to have equal oblique angles θ with respect to each other. Each of the plurality of support members 118 may be configured such that the oblique angles θ oppose one another relative to the reference plane 130.

When a radial load, such as radial load L1 in FIG. 2, is applied to the rotational member 114 via the wire 116, the resultant forces L2 arise where the rotational member 114 contacts each of the at least one support member 118. In some embodiments, such as the embodiment shown in FIG. 2, the resultant forces L2 may arise at opposing ends of the rotational member 114 at the load transfer members 124 and then are translated from the load transfer members 124 to the support members 118 at the contact interfaces 122. When the radial load L1 is applied to the support members 118 in this manner, the contact interfaces 122 are configured to translate the load into proportional axial forces L3, due to the oblique angles θ of the contact interfaces 122 of the support members 118 and the application of the resultant forces L2 acting on the contact interfaces 122. The proportional axial forces L3 may be perpendicular or generally perpendicular to the direction of the radial load L1. The proportional axial forces L1 may be parallel with the drive member 110 and axis of rotation 112. The direction in which the proportional axial forces L3 are directed is dependent on the configuration of the respective support member 118. For example, in the embodiment shown in FIG. 2, the support members 118 are configured such that proportional axial forces L3 are applied away from a center portion 142 of the rotating member 114. Although the embodiment shown in FIG. 2 shows the support members 118 being configured to apply the proportional axial forces L3 away from the center portion 142 of the rotating member 114, the support members 118 may be configured such that the proportional axial forces L3 are both applied toward the center portion 142 of the rotational member 114. It should be understood that the radial load L1 may be equally or substantially equally applied to each of the at least one support member 118 in the case of the illustrated embodiment wherein the support members 118 support the rotational member 114 in a symmetric or generally symmetric manner (i.e., at opposing axial positions). In the case of an asymmetrically supported rotation member 114, the radial load L1 may not be equally or substantially equally applied to each support member 118.

Each support member 118 may comprise at least a portion of a tapered roller bearing assembly 146. In some embodiments, for example, each support member 118 may be a cone 150 of the tapered roller bearing 146. The cone 150 may be arranged at least partially within a cup 154 of the tapered roller bearing 146. In such embodiments, the contact interface 122 may include a face where the cone 150 and the cup 154 interface within the tapered roller bearing assembly 146. Additionally, the contact interface 122 may include bearing rollers 155 or the like to reduce friction between the cup 154 and the cone 150. The bearing rollers 155 may be arranged within a cage. When the radial load L1 is applied to the winch 100 in such embodiments, the radial load L1 may be transferred to the cups 154 in a radial direction aligned with the radial load L1 as resultant loads L2. The resultant loads L2 may then be translated to the cones 150 of the tapered roller bearing 146 via the contact interface 122 to become the proportional axial forces L3, at least one of which is then applied to the at least one force sensor 119 in the axial direction D1.

The at least one force sensor 119 may be configured to measure the proportional axial force L3 applied by the at least one support member 118. The at least one force sensor 119 may be coupled to a stationary member 157 such as a backing plate or other rigid structure. The at least one force sensor 119 may be arranged adjacent to the respective support member 118, such that the support member 118 applies the proportional axial force L3 to the at least one force sensor 119. For example, the at least one force sensor 119 may be positioned adjacent to a side 158 of the cup 150 of the tapered roller bearing 146 towards which the proportional axial force L3 is directed. In some embodiments, the tapered roller bearing 146 may be supported axially by the at least one force sensor 119, such that the at least one force sensor 119 measures the pressure exerted by the cup 150 of the tapered roller bearing 146 in the axial direction D1. In embodiments which include a single force sensor 119, the support member 118 not associated with the force sensor 119 may be axially supported by a stationary member 157. In some embodiments, the at least one force sensor 119 may extend around an entire circumference of the drive member 110 or a portion of the rotating member 114. In some embodiments, the at least one force sensor 119 may only extend around a portion of the drive member 110 or a portion of the rotating member 114. In some embodiments, the at least one force sensor 119 and/or the stationary members 157 may be adjacent to the drive member 110. In some embodiments, a gap may be present between the at least one force sensor 119 and/or the stationary member 157 and the drive member 110.

In some embodiments, the at least one force sensor 119 may be a capacitive load cell that is configured to interact with the support member 118. In some embodiments, the at least one force sensor 119 may be a strain gauge load cell that is configured to interact with the support member 118. Other types of force sensors are also contemplated and the embodiments described herein are not limited to any particular force sensor arrangement.

The at least one force sensor 119 may be configured to transmit detected force information to a controller. Such a transmission may occur via a wired connection or a wireless connection, including, but not limited to, Bluetooth, Wi-Fi, radio transmission. The controller may include at least one memory for storing instructions and at least one processor for executing the instructions stored in the memory to calculate the radial load L1 based on the force data detected by the at least one force sensor 119.

The proportional axial force L3 as detected by the at least one force sensor 119 may be used to determine a magnitude of the radial load L1. Such a determination may be made by the controller. The relationship between the magnitude of the radial load L1 and the proportional axial force L3 may be dependent on a magnitude of the oblique angle θ of the support members 118. In some embodiments, the proportional axial force L3 may be directly proportional to the magnitude of the radial load L1 applied to the rotating member 114.

In some embodiments, the cone 150 of each tapered roller bearing 146 may be configured to translate away from the cup 154 in the axial direction D1 when the radial load L1 is applied to the cup 154. The translation of the cone 150 may occur due to the cup 154 acting as a wedge when the radial load L1 is applied thereto, such that the cup 154 translates in a radial direction aligned with the radial load L1 and drives the cone 150 in the axial direction D1 due to the cone 150 being squeezed between the cup 154 and the drive member 110 and/or the rotating member 114. The tapered roller bearings 146 may include bearing rollers 155 which are configured to allow the cones 150 to translate axially relative to the cups 154.

In such embodiments, the at least one force sensor 119 may be configured to measure the proportional axial forces L3 via displacement of the cones 150 relative to the cups 154. For example, the at least one force sensor 119 may be a pneumatic or hydraulic piston sensor that is configured to interact with the cone 150 of the tapered roller bearing 146. As the cone 150 of the tapered support bearing 146 translates in the axial direction D1, the cone 150 interacts with the at least one force sensor 119 by displacing the at least one force sensor 119 in the axial direction D1. The amount of displacement of the cone 150 may be indicative of the proportional axial force L3. The displacement as detected by the at least one force sensor 119 may be used to determine a magnitude of the radial load L1. In some embodiments, the displacement of the at least one force sensor 119 may be directly proportional to the magnitude of the radial load L1 applied to the winch 100.

Figure 3:
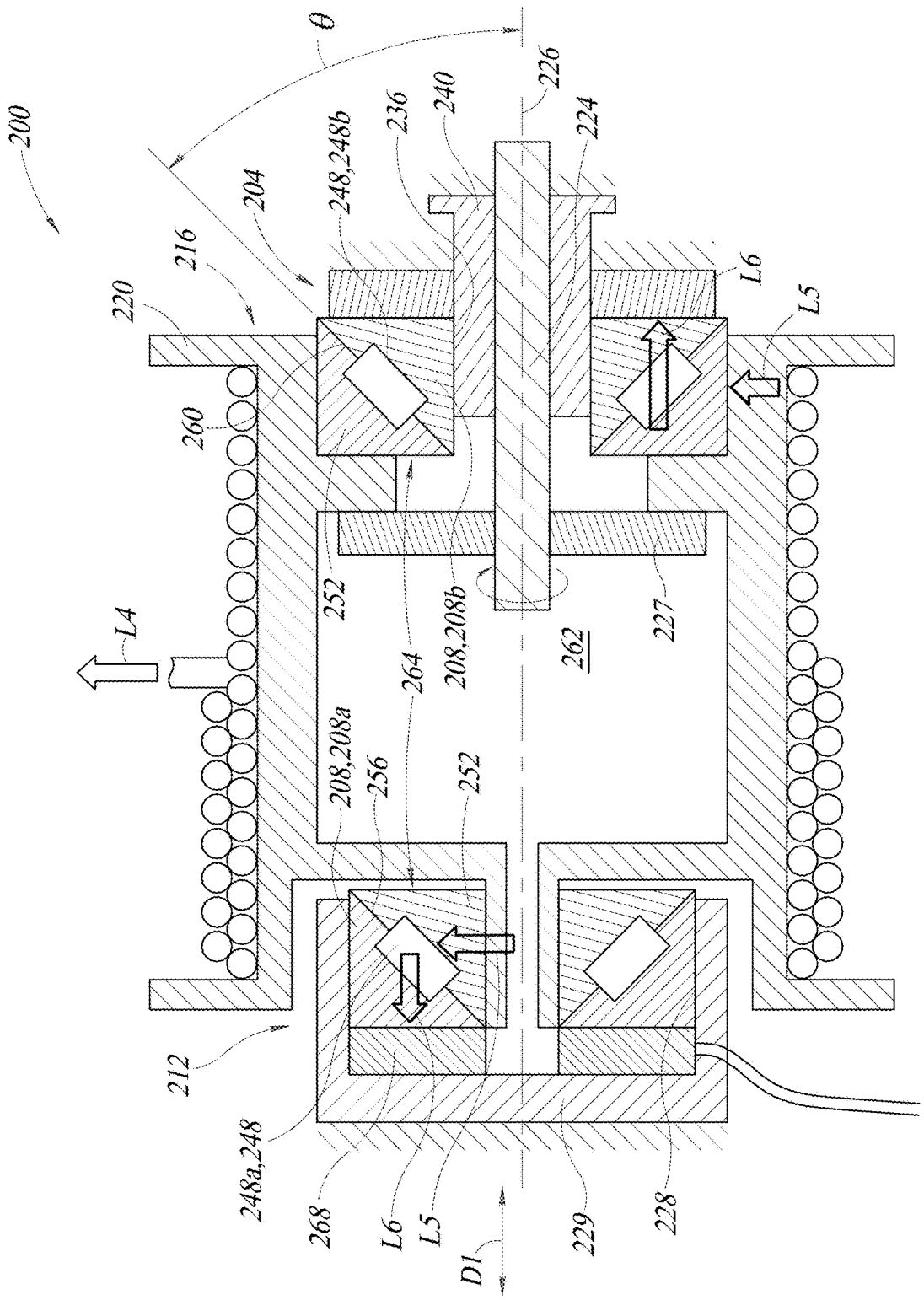
FIG. 3 shows a cross-sectional schematic view of a winch including a radial load measuring apparatus therein according to another embodiment.

FIG. 3 shows another example embodiment of a cross-sectional schematic view of a winch 200 including an example embodiment of a radial load measuring apparatus 204 when a radial load L4 is applied thereto. The radial load measuring apparatus 204 is configured similarly to the radial load measuring apparatus 117 of FIG. 2, except as described below. In the embodiment shown in FIG. 3, two support members 208 each interface with one of opposing ends 212, 216 of a rotating member 220 of the winch 200. In the embodiment shown in FIG. 3, a drive member 224 configured to rotate about a rotational axis 226 extends into one end 216 of the rotating member 220, and is coupled to the rotating member 220, such as by an intervening gear set 227 or other power transmission component, to selectively drive the rotating member 220 about the rotational axis 226 in operation. At one end 212 of the rotating member 220, the rotating member 220 is supported by a housing bore 228 of a housing 229 via one of the support members 208a. At the other end 216 of the rotating member 220, the rotating member 220 is supported by an outer circumferential surface 236 of another component, such as a brake housing 240, of a brake assembly coupled to or integrated with a drive system of the drive member 224. Again, components of the winch 200 (e.g., gear set 227, brake housing 240) are illustrated schematically and details thereof are not shown to avoid unnecessarily obscuring descriptions of the embodiments.

With continued reference to FIG. 3, each support member 208 includes a contact interface 248. In the embodiment shown in FIG. 3, a respective load transfer member 252 is arranged between the contact interface 248 and the rotating member 220 or an intervening structure coupled to the rotating member 220. The load transfer members 252 transfer a load applied to the rotating member 220 (e.g., a wire load) to the contact interfaces 248 and in turn to the respective support member 208.

In the embodiment shown in FIG. 3, the winch 200 includes a contact interface 248a of the support member 208a which is positioned on a radially-inward side 256 of the respective support member 208a, and a contact interface 248b which is positioned on a radially-outward side 260 of the respective support member 208b. In both cases, the respective support member 208a, 208b includes a load transfer member 252 configured to transfer the load L4 applied to the rotating member 220 to the contact interfaces 248. The respective support member 218a, 218b is configured to receive a resultant force L5 from the rotating member 220 due to the radial load L4 in either configuration.

When a radial load, such as radial load L4 in FIG. 3, is applied to the rotational member 220, the resultant forces L5 arise where the rotational member 220 contacts each of the at least one support member 208 via the load transfer members 252. The resultant forces L5 may arise at the load transfer members 252 and then are translated from the load transfer members 252 to the support members 208 at the contact interfaces 248. When the radial load L4 is applied to the support members 208 in this manner, the contact interfaces 248 are configured to translate the load into proportional axial forces L6, due to oblique angles θ of the contact interfaces 248 of the support members 208 and the application of the resultant forces L5 acting on the contact interfaces 248. The proportional axial forces L6 may be perpendicular or generally perpendicular to the direction of the radial load L1. In the embodiment shown in FIG. 3, the support members 208 are configured such that proportional axial forces L6 are applied away from a center portion 262 of the rotating member 220. Each support member 208 may comprise at least a portion of a tapered roller bearing assembly 264 in a similar fashion to the embodiment shown and described with respect to FIG. 2. Furthermore, at least one force sensor 268 may be configured to measure the proportional axial forces L6, similarly to the at least one force sensor 119 shown and described with respect to FIG. 2.

Figure 4:
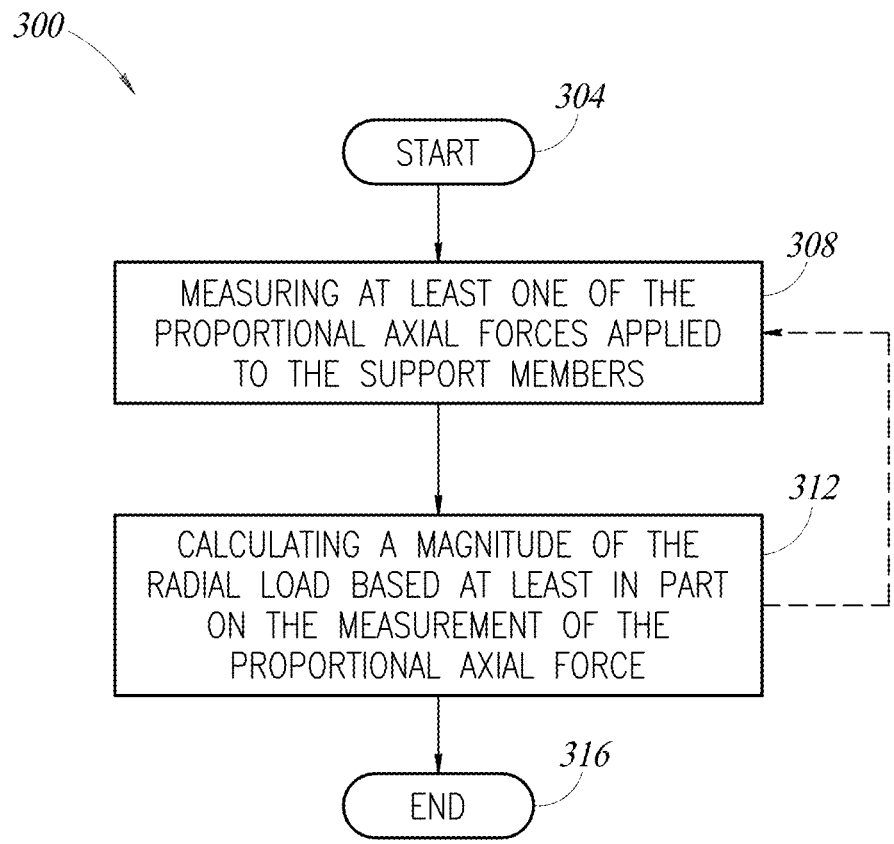
FIG. 4 shows a flow chart of a method of measuring a radial load applied to a rotational member.

FIG. 4 shows a method 300 of measuring a radial load applied to a rotational member having a radial load measuring apparatus, such as the radial load measuring apparatus described above with reference to FIG. 2. The method 300 begins at step 304 when a radial load L1 is applied to a winch or hoist 100 including a radial load measuring apparatus 117, as described herein. Such a radial load L1 may be applied via a wire 116 extending from the winch, hoist, or other device 100 utilizing the radial load measuring apparatus 117 when the winch, hoist or other device is used to lift or pull an object, for example. The radial load L1 causes the resultant forces L2 to arise at the load transfer members 124. The resultant forces L2 are then translated to the support members 118 of the radial load measuring apparatus 117, where the contact interfaces 122 translate the resultant forces L2 into proportional axial forces L3.

During application of a radial load L1, at step 308, at least one of the proportional axial forces L3 is measured. At least one of the proportional axial forces L3 is applied to at least one force sensor 119. The at least one force sensor 119 may obtain then transmit this information to a controller of the radial load measuring apparatus 117.

At step 312, a magnitude of the radial load L1, based at least in part on the measurement of the proportional axial force L3, is calculated. Such a calculation may be dependent on a magnitude of an oblique angle θ of the contact interface 122 of the support members 118 and other factors, such as the axial positions of the support members 118. The calculating of the radial load L1 may be performed by the controller of the radial load measuring apparatus 117. A calculation for determining the radial load L1 may be stored in a memory of the controller and the radial load L1 determined by the controller may be stored in the memory of the controller. In some instances, the radial load L1 may be displayed to a user or operator by a display screen or the like.

In some embodiments, the controller may be configured to output a message in response to the radial load L1 determined. For example, if the radial load L1 exceeds a predetermined threshold, which may be less than or equivalent to a maximum load rating for the winch 100, the controller may output a warning message for an excessive radial load L1. In another example, if the radial load L1 exceeds a predetermined maximum load, the controller may carry out certain actions, such as, for example, causing the motor to cease providing power to the winch 100. In another example, depending on the determined the radial load L1, the winch 100 may shift into a different ratio or motor displacement to change the load capacity of the winch 100. In a further example, if the radial load L1 exceeds a predetermined threshold, certain functions of the winch 100 may be limited.

Over time, the radial load L1 may vary. Therefore, the steps 308 and 312 may be repeated continuously or periodically over time. Each determined radial load L1 or a history of the radial load L1 may be stored in the memory of the controller.

The method 300 may end at step 316 when a radial load L1 ceases to be applied to the rotational member 114.

The operation of the controller described above in method 300 may be executed by a processor of the controller.

The radial load measuring apparatus and associated methods described herein may be adapted to a variety of different pieces of equipment or machinery, including those with winches and/or hoists. Such a radial load measuring apparatus may provide an improved testing solution when the load-handling capabilities of a winch, hoist, or other rotatable device is considered. Such a radial load measuring apparatus may provide enhanced functionality for a user or operator of the host equipment or machinery to operate the equipment or machinery in a reliable and safe manner.

The devices and systems of the disclosure each have several innovative aspects, no single one of which is solely responsible or required for the desirable attributes disclosed herein. The various features described above may be used independently of one another, or may be combined in various ways. All possible combinations and subcombinations are intended to fall within the scope of this disclosure. Various modifications to the implementations described in this disclosure may be readily apparent to those of ordinary skill in the art, and the generic principles defined herein may be applied to other implementations. Thus, the claims are not intended to be limited to the implementations shown herein, but are to be accorded the widest scope consistent with this disclosure, the principles and the novel features disclosed herein.

Certain features that may be described in this specification in the context of separate implementations also may be implemented in combination in a single implementation. Conversely, various features that may be described in the context of a single implementation also may be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A radial load measuring apparatus comprising:
   a rotational member rotatably supported to rotate about an axis of rotation and configured to be subjected to a radial load;
   at least one support member interfacing with the rotational member and having a contact interface that is oriented at an oblique angle relative to a reference plane comprising the axis of rotation such that the radial load applied to the rotational member is translated into a proportional axial force that is applied to the at least one support member in an axial direction; and
   a force sensor configured to measure the proportional axial force applied to the at least one support member from which to determine a magnitude of the radial load.

2. The radial load measuring apparatus of claim 1, wherein the at least one support member comprises at least a portion of a taper roller bearing assembly.

3. The radial load measuring apparatus of claim 1, wherein the at least one support member comprises a cone of a taper roller bearing assembly, and wherein the rotational member is fitted with a cup of the taper roller bearing assembly and wherein, during operation, the cone of the taper roller bearing assembly is able to translate away from the cup of the taper roller bearing assembly.

4. The radial load measuring apparatus of claim 1, wherein the force sensor is configured to measure the proportional axial force applied to the at least one support member via displacement of the cone of the taper roller bearing assembly relative to the cup of the taper roller bearing assembly.

5. The radial load measuring apparatus of claim 1, wherein the force sensor is a capacitive load cell that interacts with the at least one support member.

6. The radial load measuring apparatus of claim 1, wherein the force sensor is a pneumatic or hydraulic piston sensor that interacts with the at least one support member.

7. The radial load measuring apparatus of claim 1, wherein the force sensor is a strain gauge load cell that interacts with the at least one support member.

8. The radial load measuring apparatus of claim 1, wherein the proportional axial force applied to the at at least one one support member that is measured by the force sensor is directly proportional to a magnitude of the radial load applied to the rotational member.

9. The radial load measuring apparatus of claim 1, wherein the rotational member comprises a drum of a winch or hoist, and wherein the radial load applied to the drum is a wire load.

10. The radial load measuring apparatus of claim 1, wherein the radial load measuring apparatus comprises a pair of support members, wherein each support member interfaces with a respective one of the opposing ends of the rotational member.

11. The radial load measuring apparatus of claim 1, wherein the radial load measuring apparatus comprises a pair of support members, wherein the oblique angle of the contact interface of each support member is uniform.

12. An apparatus for measuring a radial wire load applied to a winch or hoist comprising:
- a drum rotatably supported to rotate about an axis of rotation and configured to be subjected to a radial wire load;
- a support member interfacing with one of opposing ends of the drum and having a contact interface that is oriented at an oblique angle relative to a reference plane comprising the axis of rotation such that the radial wire load applied to the drum is translated into a proportional axial force applied to the support member; and
- a force sensor configured to measure the proportional axial force applied to the support member from which to determine a magnitude of the radial wire load.

13. A method of measuring a radial load applied to a rotational member rotatably supported to rotate about an axis of rotation, the rotational member being supported by at least one support member, the at least one support member interfacing with the rotational member and the at least one support member having a contact interface that is oriented at an oblique angle relative to a reference plane comprising the axis of rotation such that the radial load applied to the rotational member is translated into a proportional axial force that is applied to of the at least one support member in an axial direction, the method comprising:
- during application of the radial load, measuring the proportional axial force applied to one or more of the at least one the support member; and
- calculating a magnitude of the radial load based at least in part on the measurement of the proportional axial force.

14. The method of claim 13, wherein the calculating of the magnitude of the radial load is based in part on the oblique angle of the contact interface of the at least one support member.

15. The method of claim 13, wherein the radial load varies over time and wherein the measuring of the proportional axial force applied to the at least one support member and the calculating of the magnitude of the radial load is repeated periodically over time.

* * * * *